(12) United States Patent
Lee et al.

(10) Patent No.: US 11,538,158 B2
(45) Date of Patent: Dec. 27, 2022

(54) CONVOLUTIONAL NEURAL NETWORK AND ASSOCIATED METHOD FOR IDENTIFYING BASAL CELL CARCINOMA

(71) Applicant: National Cheng Kung University, Tainan (TW)

(72) Inventors: Gwo Giun Lee, Tainan (TW); Zheng-Han Yu, Taoyuan (TW); Shih-Yu Chen, New Taipei (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 1098 days.

(21) Appl. No.: 16/171,385

(22) Filed: Oct. 26, 2018

(65) Prior Publication Data

US 2020/0134821 A1  Apr. 30, 2020

(51) Int. Cl.
G06T 7/00 (2017.01)
G06N 5/04 (2006.01)
G06T 7/44 (2017.01)
G06V 30/194 (2022.01)

(52) U.S. Cl.
CPC ........... *G06T 7/0014* (2013.01); *G06N 5/046* (2013.01); *G06T 7/44* (2017.01); *G06V 30/194* (2022.01); *G06T 2207/20081* (2013.01); *G06T 2207/30088* (2013.01)

(58) Field of Classification Search
CPC .. G06K 9/6273; G06N 3/0454; G06N 3/0481; G06N 3/08; G06N 5/046; G06T 2207/10056; G06T 2207/20081; G06T 2207/20084; G06T 2207/30088; G06T 2207/30096; G06T 7/0012; G06T 7/0014; G06T 7/44; G06V 10/82; G06V 20/698; G06V 30/194

See application file for complete search history.

(56) References Cited

U.S. PATENT DOCUMENTS

2020/0380665 A1* 12/2020 Horii .................... G06N 3/0454

FOREIGN PATENT DOCUMENTS

CN          107545248 A  *  1/2018

* cited by examiner

*Primary Examiner* — Dakshesh D Parikh
(74) *Attorney, Agent, or Firm* — Rabin & Berdo, P.C.

(57) ABSTRACT

A convolutional neural network (CNN) and associated method for identifying basal cell carcinoma are disclosed. The CNN comprises two convolution layers, two pooling layers and at least one fully-connected layer. The first convolution layer uses initial Gabor filters that model the kernel parameters setting in advance based on human professional knowledge. The method uses collagen fiber images for training images and converts doctors' knowledge to initiate the Gabor filters as featuring computerization. The invention provides better training performance in terms of training time consumption and training material overhead.

7 Claims, 2 Drawing Sheets

CONVOLUTIONAL NEURAL NETWORK AND ASSOCIATED METHOD FOR IDENTIFYING BASAL CELL CARCINOMA

BACKGROUND

Technical Field

This disclosure relates to a method for identifying basal cell carcinoma in a convolutional neural network.

Related Arts

Convolution Neural Networks (CNNs), which is a popular deep learning algorithm, have proven to be very successful for various cognitive applications, notably in computer fields that shown human like performance on a variety of recognition, classification and inference works. However, the large-scale structure and associated training complexity of CNNs as one of the most bothering issue for all modern computing platforms. The conventional CNNs require a massive and large amount of training data. For example, Google has introduced a deep learning architecture called GoogleNet inception for recognition and classification. The drawbacks are that such architecture requires over 100 thousand images for training, and the energy-efficient and time-efficient are very low.

Transferring learning is another concept that has been proposed to overcome insufficient training images, because in actual practice, only few people is able to train the entire CNNs from scratches (e.g., 1 million images with 1,000 categories). Transfer learning is the improvement of learning in a new task through the transfer from a related task that has already been learned. However, for heterogeneous digital pathology images, using transfer learning is not very helpful. It only works in deep learning if the model features learned from the first one is general. Features in heterogeneous digital pathology images are not general, and the sources of collecting heterogeneous images are limited. Although the technology of image recognition is improved, the image interpretation of heterogeneous populations still suffers from lack of robust computerization.

Accordingly, the large training overhead including time consuming and have restricted the use of CNNs to clouds and servers. Reducing training complexity is the major challenges for all CNNs.

SUMMARY

To overcome these and other above-mentioned drawbacks, a convolutional neural network (CNN) structure with a new method based on the concept of transfer learning is proposed. According to one aspect of the present invention, the CNN structure is able to use less training images and shorten the time of training whereby information is transferred from experts to CNN via characterization of its first feature layer using extracted initial Gabor features.

In one embodiment, the CNN in accordance with an embodiment of the present invention comprises layers in an order of an input component, a first convolution layer, a first pooling layer, a second convolution layer, a second pooling layer, a first fully-connected layer and an output component. The first convolution layer is a convolution layer whose initial weights are Gabor filter kernels that generate a first feature map. The second convolution layer is a convolution layer with random kernels that generates a second feature maps. The first and second pooling layers are followed the first and second convolution layers respectively. The first fully-connected layer is defined between the second pooling layer and the output component.

According to another aspect of the present invention, the method for identifying basal cell carcinoma (BCC) that is able to perform the image interpretation of heterogeneous populations in small amount of training images without using any conventional transfer learning.

In another embodiment, the method uses collagen fiber images for training images and converts doctors' knowledge to initiate the Gabor filters as featuring computerization. The method comprises steps of providing multiple normal collagen fiber images and multiple infected collagen fiber images; deploying initial Gabor filters on a first convolution layer based on the image resolution (e.g. dots per inch) and the knowledge dataset, and random Gabor filters on a second convolution layer of the convolutional neural network; training the provided images to the first convolution layer and the second convolution layer to produce feature maps; and converting feature maps in at least one fully-connected layer to generate an output component.

BCC is the most common form of skin cancer, which can cause local damage of nerves or tissues. Since the tumor growth of BCC is slow and painless, it would lead that the tumor detection is too late for removing the expansion of tumor. The method uses thousands of normal and infected collagen fibers images to train convolution neural network and initialize the kernels of convolution layer according to the experience of image processing, so that it can accurately and fast distinguish between normal and diseased skin in medical image.

BRIEF DESCRIPTION OF THE DRAWINGS

The invention is illustrated by way of example, and not by way of limitation, in the figures of the accompanying drawings in which like reference numerals refer to similar elements and in which.

DESCRIPTION OF THE PREFERRED EMBODIMENT

Several exemplary embodiments will now be described with respect to the accompanying drawings. While particular embodiments, in which one or more aspects of the disclosure may be implemented, other embodiments may be used and various modifications may be made without departing from the scope of the disclosure or the spirit of the claimed invention. The data used in two dimensional, are described below, should be understood that the invention can be worked with data having other dimensionalities.

Figure 1:
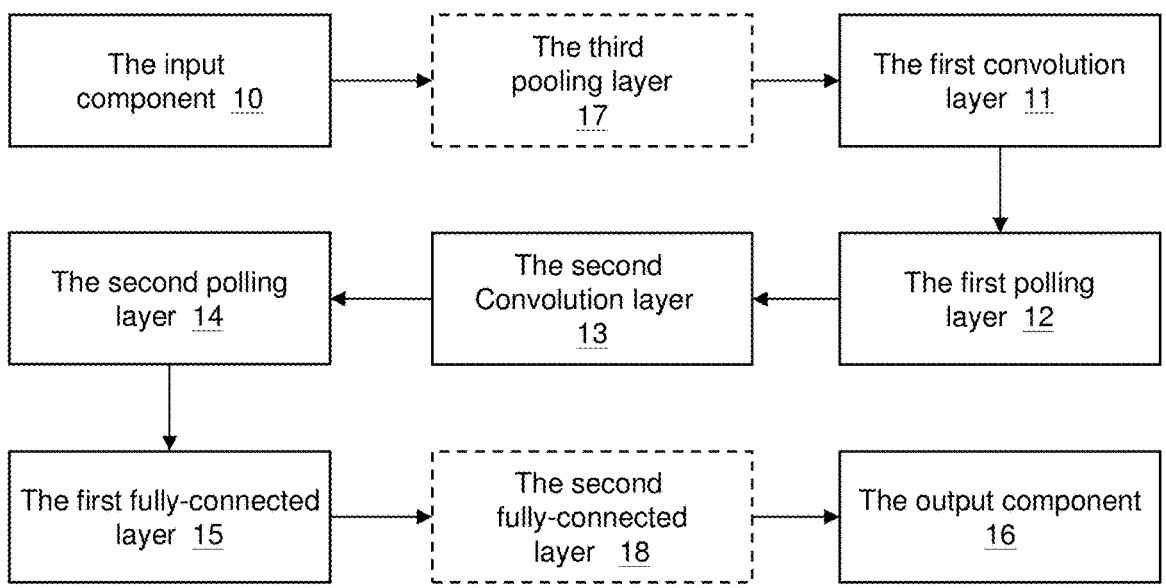
FIG. 1 is an exemplary diagram illustrating a structure of a convolutional neural network in accordance with an embodiment of the present invention.

With reference to FIG. 1, FIG. 1 is an exemplary diagram illustrating a structure of a convolutional neural network in accordance with an embodiment of the present invention. In this embodiment, the convolutional neural network (CNN) comprises layers in an order of an input component 10, a first convolution layer 11, a first pooling layer 12, a second convolution layer 13, a second pooling layer 14, a first fully-connected layer 15 and an output component 16. As shown in FIG. 1, an optional third pooling layer 17 can be applied between the input component 10 and the first convolution layer 11, and an optional second fully-connected layer 18 can be applied between the first fully-connected layer 15 and the output component 16. In the present invention, the depth of the CNN is in a range of 5 to 7 layers.

The input component receives the images. The batch size, in this embodiment, is 32. Each image has information of the pixel size (i.e., how many pixels per inch). The first convolution layer 11 is a 7×7 convolution layer with 24 initial Gabor filter kernels that generates a first feature map. The first convolution layer 11 whose initial weights are Gabor filter kernels. The second convolution layer 13 is a 5×5 convolution layer with 16 random kernels that generates a second feature maps. Each of convolution layers 11, 13 followed by the first pooling layer 12 and the second pooling layer 14 respectively. The purpose of each pooling layer 12, 14, 17 is to combine similar features into one, which reducing dimensions of the feature maps.

In this embodiment, both first and second pooling layer 12, 14 is a 2×2 max-pooling layer. The max-pooling layer calculates the maximum of a local patch of units inside a 2×2 region of the input feature map and steps pixels between pooling regions. This can help the learned features be invariant to shifts and distortions. Therefore, the first pooling layer 12 reducing dimensions of the first feature maps from the first convolution layer 11, and the second pooling layer 14 reducing dimensions of the second feature maps from the second convolution layer 13. The first fully-connected layer 15 is the "high level reasoning" layer that takes information derived from all of the previous neural network processing to output a weighted sum to an output component 16 for classifying the images from the input component 10. The first fully-connected layer 15 takes the second feature maps as input and combines them into a feature vector. In one embodiment, the feature vector of the first fully-connected layer is consisted of 200 neurons.

The number and characteristics of the initial Gabor filters may be varied such as the image size. However, in one embodiment of the present invention, the number of kernels to the initial Gabor filters corresponded to the number of frequency carriers multiplied by a number of orientation vectors. In other words, the number of frequency carriers is determined based on the scale of targeting features and the pixel size of the image.

In one embodiment, each initial Gabor filter is defined into a Fourier transformation of two-dimensional Gabor-filter as following:

$$G(u,v;\sigma_x,\sigma_y,\Omega,\theta)=e^{-1/2((\sigma_x(u'-\omega))^2+(\sigma_y v')^2))};$$

$$u'=u\cos\theta+v\sin\theta;\text{ and}$$

$$v'=-u\sin\theta+v\cos\theta,$$

where $0°\le\theta<360°$.

$\omega$ is the fundamental frequency and $$\omega=\frac{\pi}{n},$$

and n is a real number representing the scale of the targeting features; and $\sigma_x$ and $\sigma_y$ are standard deviations which has a relation of $$\frac{\lambda}{\omega},$$

$\lambda$ is a positive real number. The $\lambda$ can be predefined corresponded to the scale of targeting features. The optional third pooling layer 17, in this embodiment, may be a 2×2 average-pooling layer that did similar task as the 2×2 max-pooling layer. The third pooling layer 17 calculates the average value of a local patch of units inside a 2×2 region of the input image and steps pixels between pooling regions. As above mentioned, the first fully-connected layer 15 graded the second feature maps consisting of 200 neurons, the second fully-connected layer 18 is optional added after the first fully-connected layer 15 that further reduce the number of neurons into a desired number. The second fully-connected layer 18 is defined between the first fully-connected layer 15 and the output component 16, which contains two neurons representing the detection result.

Figure 2:
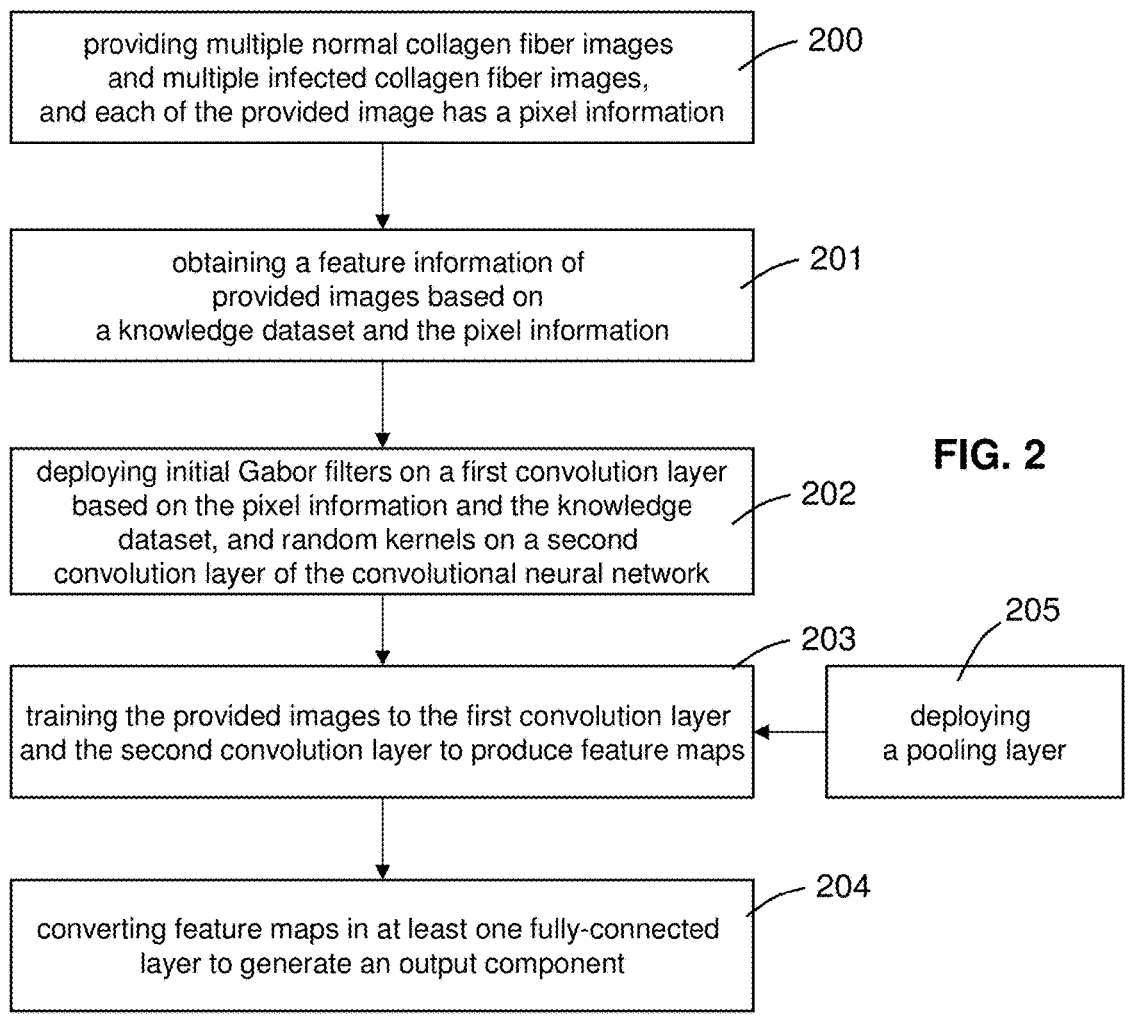
FIG. 2 is an exemplary diagram illustrating a flow chart of a method for identifying basal cell carcinoma in accordance with an embodiment of the present invention.

With further reference to FIG. 2, FIG. 2 is an exemplary diagram illustrating a flow chart of a method for identifying basal cell carcinoma in accordance with an embodiment of the present invention. In this embodiment, the method uses the above-mentioned CNN structure illustrated in FIG. 1.

Basal Cell Carcinoma (BCC) is the most common form of skin cancer which can cause local damage of nerves or tissues. The tumor growth of BCC is very slow and painless, it would lead that the tumor diction is too late for removing the expansion of tumor.

The Gabor filter mentioned earlier is a popular tool for extracting spatially localized spectral features, especially to be appropriate for texture representation and discrimination due to its degree of invariance to scale, rotation and translation. The inventor has realized that the collagen fiber image is an ideal texture representation of heterogeneous digital pathology images to skin. Therefore, as shown in FIG. 2, the method for identifying basal cell carcinoma comprises steps of:

S200 providing multiple normal collagen fiber images and multiple infected collagen fiber images, and each of the provided image has a pixel information;

S201 obtaining a feature information of provided images based on a knowledge dataset and the pixel information; and S202 deploying initial Gabor filters on a first convolution layer based on the pixel information and the knowledge dataset, and random kernels on a second convolution layer of the convolutional neural network;

S203 training the provided images to the first convolution layer and the second convolution layer to produce feature maps; and S204 converting feature maps in at least one fully-connected layer to generate an output component.

The method further comprises an act of S205 deploying at least one pooling layer, which is able to reduce the dimensions. Each initial Gabor filter is defined into a Fourier transformation of a two-dimensional Gabor-filter:

$$G(u,v;\sigma_x,\sigma_y,\Omega,\theta)=e^{-1/2((\sigma_x(u'-\omega))^2+(\sigma_y v')^2))};$$

$$u'=u\cos\theta+v\sin\theta;\text{ and}$$

$$v'=-u\sin\theta+v\cos\theta,$$

wherein $\theta$ are orientation vectors, and $0°\le\theta<360°$.

Accordingly, the information of these tube-like collagen fiber images can be used to tune kernels of the Gabor filters in the convolution layer in a very easy way. Since θ are orientation vectors, which are corresponded to the directions of each collagen fibers (i.e., tube). The degrees of the orientation vectors are 0 to 360. The standard deviations ($\sigma_x$, $\sigma_y$) and the fundamental frequency (ω) controls the size and scale of the tube-like features.

In step S200, each of the provided images (e.g., normal collagen fiber images and infected collagen fiber images) has its own pixel information. It is information that initially provided when image is created, which represents the pixel size (pixels per inch).

Since the pixel information for all provided images are known in advance, the "actual size" for all features presented in images can be calculated. Then, in step S201, the knowledge dataset comprises the basal cell carcinoma feature from clinical data, doctors' descriptions and text books. The basal cell carcinoma features in the knowledge dataset are the information for doctors to discriminate the basal cell carcinoma in a manner of histopathologic analysis. The size of each collagen fiber can be properly featured by giving different kernel parameters setting of Gabor filter.

In contrast, it unlikely the conventional transfer learning using a learned model features, the steps S200 to S202 introduce a concept that covert the professional human knowledge to modeling the kernel parameters setting of Gabor filters which enhance the feature extraction.

Figure 3:
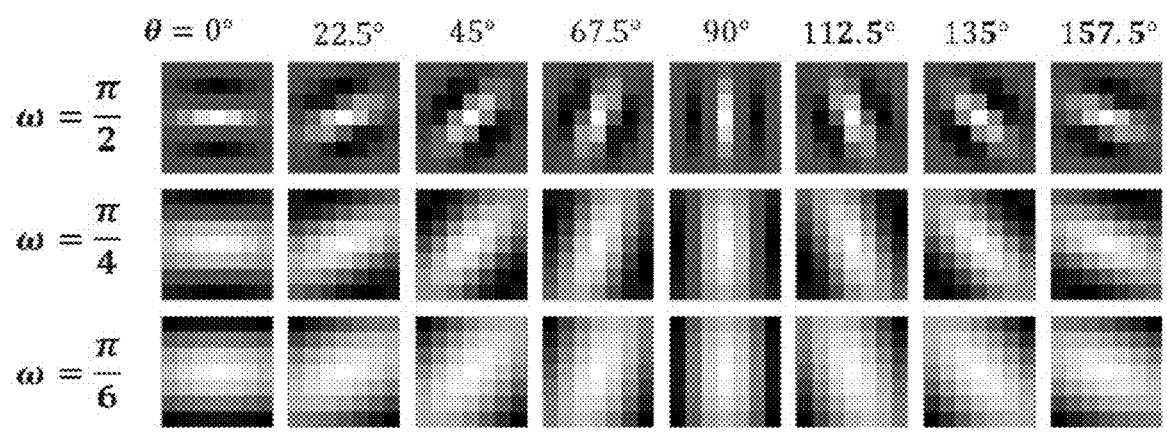
FIG. 3 is an exemplary diagram illustrating visualization of Gabor Kernels in accordance with an embodiment of the present invention.

As shown in FIG. 3, FIG. 3 is an exemplary diagram illustrating visualization of Gabor kernels in accordance with an embodiment of the present invention. In this embodiment, based on the feature information of provided images, n is set to be {2, 4, 6}, and the λ is predefined in a range of 1.5 to 5 which 2.46 is used in the current embodiment. The orientation is spaced in every 22.5°. The orientation vectors comprises 0°, 22.5°, 45°, 67.5°, 90°, 112.5°, 135°, 11.25° and 157.5°. Those parameters setting the known as best model for provided images. However, it should be understood that the parameters may be varied according to the provided images for training, since the feature information are different.

In this embodiment, the numbers of provided images are 2640 normal collagen fiber images and 3244 infected collagen fiber images, wherein 2112 normal and 2595 infected collagen fiber images used for training. The type of provide image is non-invasive image which is considered low quality compared to the invasive image. The hyperparameter of the convolutional neural network show in Table I in below.

TABLE I

| Batch size | 32 |
|---|---|
| Optimization method | Stochastic gradient descent |
| Learning Rate | 0.01 |
| Momentum | 0.9 |
| Learning Rate Policy | Inverse Decay |

The training result is satisfied with 97.02% accuracy, 95.08% specificity and 99.04% sensitivity. The embodiments of the present invention are able to train CNNs for only about 2000 training images and remain high accuracy. Accordingly, compared to the conventional CNNs (e.g., GoogleNet inception v3), based on the paper tilted "Dermatologist-level classification of skin cancer with deep neural networks, the present invention established better performance with lower overhead shown in below Table II.

TABLE II

|  | Google Net inception v3 | The embodiment of the present invention |
|---|---|---|
| Training images | 130,000+ | 2,000+ |
| Transfer learning | Yes | Information transfer via initial Gabor feature extraction |
| Depth of layers | 10+ | Less than 7 |

References throughout this specification to "embodiments," "one embodiment" or "an embodiment" means that a particular feature, structure, or characteristic described in connection with the embodiment is included in at least one embodiment of the invention, but do not denote that they are present in every embodiment. Thus, the appearances of the phrases "in embodiments," "in one embodiment" or "in an embodiment" in various places throughout this specification are not necessarily referring to the same embodiment of the invention.

Also, it is noted that at least some implementations have been described as a process that is depicted as a flowchart or a block diagram. Although a flowchart may describe the operations as a sequential process, some of the operations can be performed in parallel or concurrently. In addition, the order of the operations may in some cases be re-arranged. The various methods and components described herein may be partially or fully implemented by programming (e.g., instructions and/or data) that may be stored in a machine-readable, computer-readable, and/or processor-readable storage medium, and executed by one or more processors, machines and/or devices.

The various features associate with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Therefore, the scope of the present invention shall be defined and protected by the following claims and their equivalents.

What is claimed is:

1. A convolutional neural network, comprising layers in an order of:
    an input component receiving a batch of an image;
    a first convolution layer with initial Gabor filters that generates a first feature map;
    a first pooling layer reducing dimensions of the first feature maps;
    a second convolution layer with random kernels that generates a second feature maps;
    a second pooling layer reducing dimensions of the second feature maps; and
    a first fully-connected layer classifying the second feature maps into an output component, wherein
    each initial Gabor filter is defined into a Fourier transformation of Gabor-filter in an equation of:

$$G(u,v;\sigma_x,\sigma_y,\Omega,\theta) = e^{-1/2((\sigma_x(u'-\omega))^2 + (\sigma_y v')^2)};$$

$$u' = u\cos\theta + v\sin\theta; \text{ and}$$

$$v' = -u\sin\theta + v\cos\theta, \text{ where } 0° \leq \theta < 360°.$$

2. The convolutional neural network as claimed in claim 1 further comprising a third pooling layer defined between the input component and the first convolution layer.

3. The convolutional neural network as claimed in claim 1, wherein a number of kernels to the initial Gabor filters corresponded to a number of frequency carriers multiplied by a number of orientation vectors.

4. The convolutional neural network as claimed in claim 3, wherein the number of frequency carriers is determined based on the scale of targeting features and the pixel size of the image.

5. The convolutional neural network as claimed in claim 1, wherein $\omega$ is the fundamental frequency and $$\omega = \frac{\pi}{n},$$

n is a real number representing the scale of the targeting features; and $\sigma_x$ and $\sigma_y$ are standard deviations which has a relation of $$\frac{\lambda}{\omega},$$

and $\lambda$ is a positive real number.

6. The convolutional neural network as claimed in claim 5, wherein $\lambda$ is predefined in a range of 1.5 to 4.

7. The convolutional neural network as claimed in claim 1, further comprising a second fully-connected layer defined between the first fully-connected layer and the output component, which contains two neurons representing the detection result.

* * * * *